United States Patent
Chan et al.

(10) Patent No.: US 9,325,786 B2
(45) Date of Patent: Apr. 26, 2016

(54) PEER-TO-PEER INTERACTIVE MEDIA-ON-DEMAND

(75) Inventors: Shueng Han Gary Chan, Hong Kong (CN); Wai Pun Yiu, Hong Kong (CN); Anthony Cheuk Pan Lui, Hong Kong (CN)

(73) Assignee: THE HONG KONG UNIVERSITY OF SCIENCE AND TECHNOLOGY, Hong Kong (CN)

( * ) Notice: Subject to any disclaimer, the term of this patent is extended or adjusted under 35 U.S.C. 154(b) by 1355 days.

(21) Appl. No.: 11/761,986

(22) Filed: Jun. 12, 2007

(65) Prior Publication Data

US 2008/0037527 A1 Feb. 14, 2008

Related U.S. Application Data

(60) Provisional application No. 60/833,523, filed on Jul. 27, 2006.

(51) Int. Cl.
*G06F 15/173* (2006.01)
*H04L 29/08* (2006.01)
(Continued)

(52) U.S. Cl.
CPC ............ *H04L 67/104* (2013.01); *H04L 67/108* (2013.01); *H04L 67/1065* (2013.01); *H04L 67/1091* (2013.01); *H04N 21/632* (2013.01); H04L 29/08324 (2013.01); H04L 29/08396 (2013.01); H04L 29/08414 (2013.01); H04L 65/4084 (2013.01); H04N 21/6377 (2013.01); H04N 21/6405 (2013.01)

(58) Field of Classification Search
CPC ...................... H04L 167/104; H04L 167/1065; H04L 167/1072; H04L 167/1089; H04L 67/104; H04L 67/1065; H04L 67/1072; H04L 67/1089; H04L 29/08324; H04L 29/08396; H04L 29/08414; H04N 21/6377; H04N 21/6405
USPC .......................................................... 709/225
See application file for complete search history.

(56) References Cited

U.S. PATENT DOCUMENTS 7,054,867 B2   5/2006  Bosley et al.
7,593,326 B2 *  9/2009  Collet et al. ................... 370/229
(Continued)

FOREIGN PATENT DOCUMENTS

WO    WO 2005/119498    * 12/2005   .............. G06F 17/00

OTHER PUBLICATIONS

Yiu, Supporting Interactive Media-on-Demand Service in Peer-to-Peer Netowork, Nov. 24, 2005 http://aoeit.ie.cuhk.edu.hk/docs/TalkNov24_05.pdf.*

(Continued)

*Primary Examiner* — Larry Donaghue
*Assistant Examiner* — James Conaway
(74) *Attorney, Agent, or Firm* — Amin, Turocy & Watson, LLP

(57) ABSTRACT

A scalable Media-on-Demand (MoD) method to a large group of users in the Internet. This method makes use of peer buffering capabilities to collaborate in the distribution and downloading of media, facilitated by a central repository for the search of optimal peers as parent nodes to connect to and for the support of advanced features such as fast forward and backward plays. The method relieves the server load by shifting the media streaming functionality to the client side with high media receiving continuity and quality, leading to well-balanced and low network loads.

17 Claims, 14 Drawing Sheets

1-sec media segment

(51) Int. Cl.
   H04N 21/63    (2011.01)
   H04L 29/06    (2006.01)
   H04N 21/6405  (2011.01)
   H04N 21/6377  (2011.01)

(56) References Cited

U.S. PATENT DOCUMENTS

| | | | |
|---|---|---|---|
| 9,021,018 B2* | 4/2015 | Kiesel et al. | 709/203 |
| 2005/0216473 A1* | 9/2005 | Aoyagi | G06F 17/30206 |
| 2005/0216942 A1* | 9/2005 | Barton | 725/97 |
| 2006/0212595 A1* | 9/2006 | Chen et al. | 709/232 |
| 2006/0224760 A1* | 10/2006 | Yu et al. | 709/231 |
| 2006/0230107 A1* | 10/2006 | Yu et al. | 709/204 |
| 2007/0266169 A1* | 11/2007 | Chen et al. | 709/231 |
| 2007/0288638 A1* | 12/2007 | Vuong et al. | 709/226 |
| 2007/0294422 A1* | 12/2007 | Zuckerman | G06F 17/30206 709/230 |
| 2008/0140853 A1* | 6/2008 | Harrison | 709/231 |
| 2009/0106386 A1* | 4/2009 | Zuckerman et al. | 709/215 |
| 2009/0164656 A1* | 6/2009 | Guan | 709/231 |
| 2009/0300673 A1* | 12/2009 | Bachet et al. | 725/31 |

OTHER PUBLICATIONS

Wiktionary, Wiktionary Definition of Locality, Dec. 20, 2011, http://en.wiktionary.org/wiki/locality.*
Wikipedia, Pastry (DHT), May 23, 2006, http://en.wikipedia.org/w/index.php?title=Pastry_(DHT)&diff=54619524&oldid=54472492.*
Rowstron et al., Pastry: Scalable, distributed object location and routing for large-scale peer-to-peer systems, 2001 http://citeseer.ist.psu.edu/viewdoc/summary?doi=10.1.1.28.5987.*
Plavec et al., Distributed File Replication System based on FreePastry DHT, Dec. 2004 http://www.eecg.toronto.edu/~czajkow/toms_publications.html.*
Castro et al., Exploiting network proximity in distributed hash tables, 2002, http://citeseer.ist.psu.edu/viewdoc/summary?doi=10.1.1.126.3062.*
K. Hua, Y.Cai, and S. Sheu, "Patching: A Multicast Technique for True Video-on-Demand Services", Proceedings of the 6th ACM International Conference on Multimedia (MM), Bristol, England, Sep. 1998.
A. Hu, "Video-on-Demand Broadcasting Protocols: A Comprehensive Study", Proceedings of IEEE INFOCOM, Anchorage, AK, US, Apr. 2001.
D. Eager, M. Vernon, and J. Zahorjan, "Bandwidth Skimming: A Technique for Cost-Effective Video-on-Demand", Proceedings of SPIE/ACM Conference on Multimedia Computing and Networking (MMCN), San Jose, CA, US, Jan. 2000.
Y. Chu, S. Rao, and H. Zhang, "A Case for End System Multicast", Proceedings of ACM SIGMETRICS, Santa Clara, CA, US, Jun. 2000.
[Online] http://www.bittorrent.com.
X. Zhang, J. Liu, B. Li, and T.-S. P. Yum, "CoolStreaming/DONet: A Data-driven Overlay Network for Live Media Streaming", Proceedings of IEEE INFOCOM, Miami, FL, US, Mar. 2005.
K. Sripanidkulchai, A. Ganjam, B. Maggs, and H.Zhang, "The Feasibility of Supporting Large-Scale Live Streaming Applications with Dynamic Application End-Points", Proceedings of ACM SIGCOMM, Portland, OR, US, Aug. 2004.
M. Gao, M.H. Ammar, "Scalable Live Video Streaming to Cooperative Clients Using Time Shifting and Video Patching", Proceedings of IEEE INFOCOM, Hong, Kong, Apr. 2004.
A. Sharma, A. Bestavros, and I. Matta, "dPAM: A Distributed Prefetching Protocol for Scalable Asynchronous Multicast in P2P Systems", Proceedings IEEE INFOCOM, Miami, FL, US, Mar. 2005.
Y. Cui, B. Li, and K. Nahrstedt, "oStream: Asynchronous Steaming Multicast in Application-Layer Overlay Networks", IEEE Journal on Selected Areas in Communications (JSAC), vol. 22, No. 1, Jan. 2004.
M. Guo, M.H. Ammar, and E. W. Zegura, "Cooperative Patching: A Client Based P2P Architecture for Supporting Continuous Live Video Streaming", Proceedings of the 13th IEEE International Conference on Computer Communications and Networks (ICCCN), Chicago, IL, US, Oct. 2004.
T.T. Do, K.A. Hua, M.a. Tantaoui, "P2VoD: Provising Fault Tolerant Video-on-Demand Streaming in Peer-to-Peer Environment", Proceedings of IEEE International Conference on Communications (ICC), Paris, France, Jun. 2004.
Y. Guo, K.Suh, J. Kurose, D. Towsley, P2Cast: Peer-to-Peer Patching Scheme for VoD Service, Proceedings of the 12th ACM International World Wide Web Conference (WWW), Budapest, Hungary, May 2003.
V. N. Padmanabhan, H.J. Wang, P.A. Chou, and K. Sripanidkulchai, "Distributing Streaming Media Content Using Cooperative Networking", Proceedings of the 12th ACM International Workshop on Network and Operating Systems Support for Digital Audio and Video (NOSSDAV), Miami Beach, FL, US, May 2002.
K. A. Hua, D. A. Tran, and R. Villafane, "Overlay Multicast for Video on Demand on the Internet", Proceedings of the 18th ACM Symposium on Applied Computing (SAC), San Francisco, CA, US, Mar. 2003.
M. Zhou, J. Liu, "A Hybrid Overlay Network for Video-on-Demand", Proceedings of IEEE International Conference on Communications (ICC), Seoul, Korea, May 2005.
M. Hefeeda, A. Habib, B. Botev, D. Xu, and B. Bhargava, "PROMISE: Peer-to-Peer Media Streaming Using CollectCast", Proceedings of the 11th ACM International Conference on Multimedia (MM), Berkeley, CA, US, Nov. 2003, pp. 45-54.
S. Ratnasamy, P. Francis, M. Handley, R. Karp, S. Shenker, "A Scalable Content-Addressable Network", Proceedings of ACM SIGCOMM, San Diego, CA, US, Aug. 2001.
I. Stoica, R. Morris, D. Liben-Nowell, D.R. Karger, M.F. Kaashoek, F. Dabek, H. Balakrishnan, "Chord: A Scalable Peer-to-Peer Lookup Protocol for Internet Applications", IEEE/ACM Transactions on Networking, 2003, vol. 11, No. 1, pp. 17-32.
A. Rowstron, P. Druschel, "Pastry: Scalable, Distributed Object Location and Routing for Large-Scale Peer-to-Peer Systems", Proceedings of IFIP/ACM international Conference on Distributed Systems Platforms (Middleware), Heidelberg, Germany, Nov. 2001, pp. 329-350.
E.W. Zegura, K. Calver, S. Bhattacharjee, "How to Model an Internetwork", Proceedings of IEEE INFOCOM, San Francisco, CA, US, Apr. 1996.
T.S. E. Ng, H. Zhang; "Predicting Internet Network Distance with Coordinates-Based Approaches", Proceedings of IEEE INFOCOM, New York, NY, US, Jun. 2002.
F. Dabek, R. Cox, F. Kaashoek, R. Morris, "Vivaldi: A Decentralized Network Coordinate System", Proceedings of ACM SIGCOMM, Portland, OR, US, Aug. 2004.
T. Asano, D. Ranjan, T. Roos, E. Welzl, P. Widmaier, "Space Filling Curves and Their Use in Geometric Data Structures", Theoretical Computer Science, vol. 181, No. 1, pp. 3-15, Jul. 1997.

* cited by examiner

Fig. 3. The 32-bit DHT search key constructed by three parts: hashed media information, virtual starting slot ID and space filling curve mapped network coordinates of the peer.

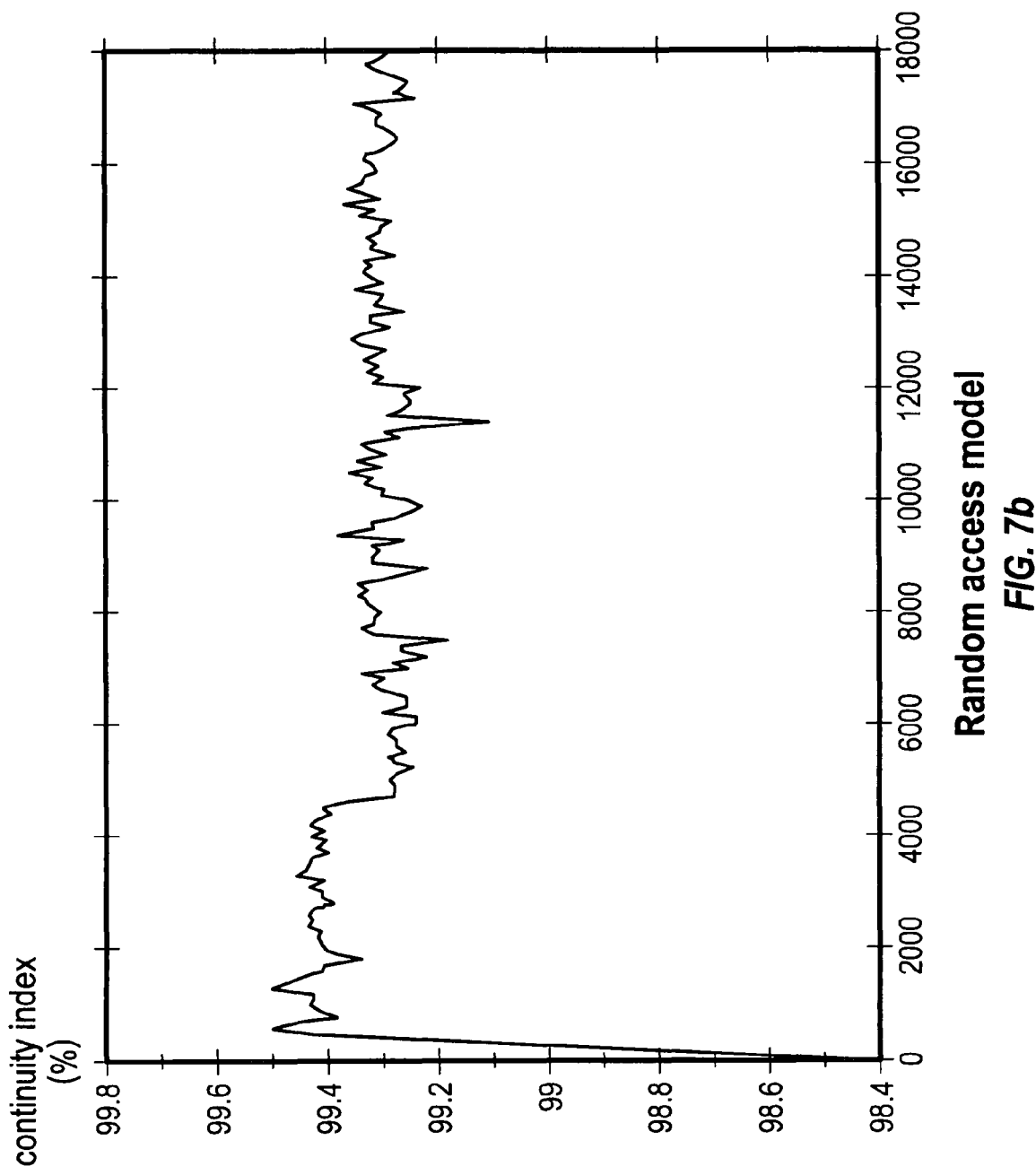

PEER-TO-PEER INTERACTIVE MEDIA-ON-DEMAND

CROSS-REFERENCE TO OTHER APPLICATION

This application claims priority from U.S. provisional patent application 60/833,525 filed on Jul. 27, 2006, which is hereby incorporated by reference.

BACKGROUND AND SUMMARY OF THE INVENTION

The present application relates to media streaming in communications networks, and more particularly to providing structured peer-to-peer overlay network in support of interactive media-on-demand applications.

Background: Media-on-Demand in the Internet

With the grow of popularity of broadband Internet access, there has been increasing interest on media streaming services. Media-on-Demand (MoD) is one of such attractive services where music or movies are delivered to desktops of distributed users with low delay and free interactivity (supporting, for example, pause, jump forward/backward, etc.). However, MoD provided by traditional server-client model (in which each client has a dedicated stream from server) does not scale to hundreds or even thousands of MoD clients. This is mainly due to heavy server load and limited network bandwidth at the server side. Despite many proposals on scalable media streaming, providing such services is still challenging due to the lack of widely deployed multicast-capable networks and dedicated proxy servers. Recently, peer-to-peer technologies (P2P) have become useful and popular for many scalable applications, for instance, multicasting and file sharing among users over the world.

In P2P systems, cooperative peers self-organize themselves into overlay networks via unicast tunnels. Each peer (called overlay node) in an overlay network acts as an application-layer proxy, caching and relaying data for others. In addition, by sharing their own resources such as storage and network bandwidth, the capacity of the whole system is vastly amplified compared to traditional server-client architecture. Recent research shows that it is feasible to support large-scale media streaming in the Internet using P2P approach.

Though P2P approach is able to support on-demand media streaming, the problem is still challenging. Because of the unpredictability of user requests in on-demand media streaming, multicasting the stream using ALM cannot fulfill all asynchronous user access requests. Further, unreliable and dynamic peers call for a more robust and resilient system design, and the difficulty is worsened by the dynamic access pattern made by user interactivity.

The lack of widely deployed multicast-capable networks limits the capability to provide on-demand media streaming using IP multicast. Live media streaming using P2P approach is even harder. Since users in those systems receive the same portion of the media simultaneously, any peer can exchange the content with others. However, in P2P MoD system, there is a temporal dependency among peers. This means only peers with the requested media in their buffers could serve the requesting peer. Therefore, it is more restrictive to find parents in P2P Mod system. Further limited is the interactivity in live streaming which is not supported in today's systems.

Most of current P2P Mod systems organize peers into tree-based overlays, where a parent failure would adversely affect all its descendants. When other systems use multiple parents to solve the problem, all parents there are required to have a full copy, an unrealistic requirement!

Yet another hybrid approach is available. Upon a tree overlay, a gossip-based data exchange mechanism is added to withstand the unreliability of peers. Since all the parent-children relationships and gossip partners are assigned by a central server, the central server needs to keep track of all the users. In a P2P system this centralized approach potentially generates a large amount of control traffic to congest the network near the central server. A later development of a distributed gossip partnership management uses a distributed AVL tree to search parents. But, it does not consider the network locations of peers in assigning parent-children relationship and partnership. Bad assignment may lead to transmission of the stream to and fro some bottleneck links many times. Also, transmission from distant parents may experience higher probability of packet loss.

Prime: Peer-to-Peer Interactive Media-on-Demand

The present application provides a new architecture for Media-on-Demand (MoD) service to a large group of users in the Internet which is quite different from prior approaches, and which has greatly improved scaling characteristics. In various embodiments this is implemented with a decentralized approach, leading to a system scalable to large number of users. Experimental results show that PRIME achieves very low server load with well-balanced and low client load. Additionally, the quality of received media is high while control bandwidth overhead is low.

The advantages of the proposed approach are highlighted as follows:

Scalability—by distributing streaming tasks to peers the system could support thousands of users with low server bandwidth required.

Efficiency—users could start playing the media within a few seconds.

Resilience to node/link failure—because of multi parent nodes support node/link failure does not affect the quality of received media.

Supporting user interactivity—because of the buffering and indexing techniques system could support random seeking in the media.

Completely decentralized—the system does not rely on a single server to organize overlay nodes.

Low client cache requirement—because clients are not required to store a full copy of media, system does not require high client cache capability.

Finally system design supports clients' bandwidth and cache heterogeneity, and minimized node failure or departure effects because of the support of multi senders.

BRIEF DESCRIPTION OF THE DRAWINGS

The disclosed inventions will be described with reference to the accompanying drawings, which show important sample embodiments of the invention and which are incorporated in the specification hereof by reference, wherein.

Finally.

DETAILED DESCRIPTION OF THE PREFERRED EMBODIMENTS

The numerous innovative teachings of the present application will be described with particular reference to the presently preferred embodiment (by way of example, and not of limitation).

The disclosure proposes a new scheme called PRIME (Peer-to-peeR Interactive MEdia-on-demand). PRIME utilizes the strong buffering capability of overlay nodes. A node here can be a communications device with networking capability or network device with video capability, including computer, video phone, mobile devices, etc. Each overlay node buffers the stream it just played back, for a period of time. The buffered data can then be streamed to another node. The buffering node is referred as the parent of the receiving node. In PRIME, multiple parents are used to serve a node. Each of the parents streams a non-overlapping portion of the media to the requesting node in parallel.

Using multiple parents has the following advantages: 1) The effect of parent departure or failure can be minimized since a single parent failure would not degrade the quality of received media very much. Also, other parents could share the load of the failed parent while the receiver is searching for a new parent to substitute the failed parent. 2) Bandwidth heterogeneity among parents is addressed by assigning the size of each requested portion to be proportional to the parent's upload bandwidth. 3) Since most Internet connections (e.g. ADSL) are asymmetric, i.e. upload bandwidth does not equal to (usually less than) download bandwidth, a single parent may not have enough upload bandwidth to serve a node while aggregate upload bandwidth from multiple parents could solve the problem.

Figure 1:
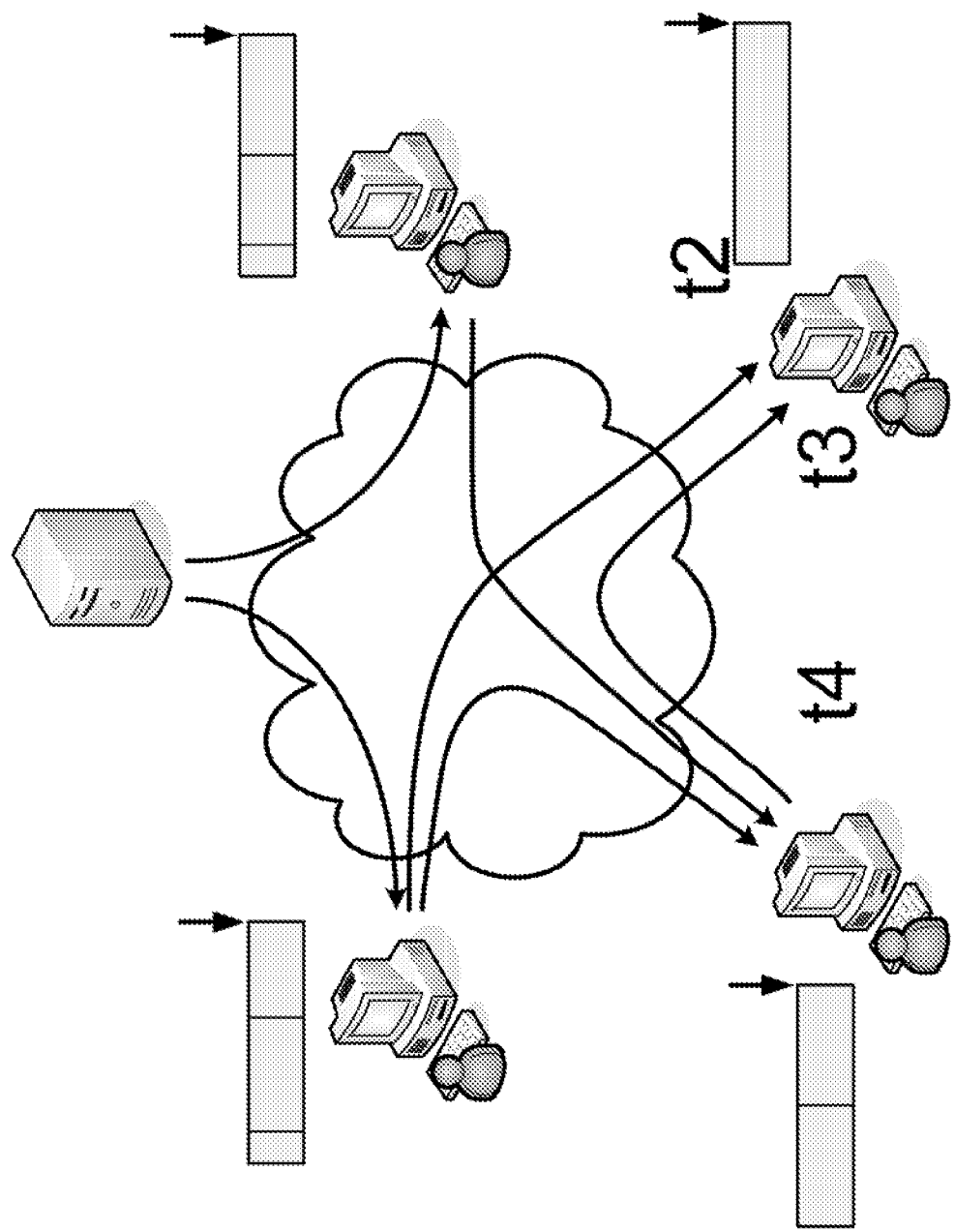
FIG. 1 shows an example of PRIME architecture and operations.

FIG. 1 shows the idea of PRIME operation. In the figure, the rectangle above each peer indicates the buffer of that peer, while the pointer above the rectangle indicates the position of the buffer the peer is playing. As shown in the figure, users join at earlier time with its buffer caching the media just played out could support other users who join later. For example, the user joins at t2 could stream to the users join at t3 and t4 since its buffer contains the stream data those users are collecting.

PRIME also employs collaboration among peers. For a system with a large user pool, peers can probably find some other peers who are looking for the same period of the media. Those peers, called partners, could cooperate to download the commonly required media and then exchange the downloaded data. In order to meet the playback deadline of each segment in the media, the preferred embodiment prefers parents and partners with short round-trip time (RTT). Also, avoiding long distance transmissions could save network resources, hence the network would not be congested by the application traffics. Therefore, the preferred embodiment teaches how PRIME makes a good use of distributed hash table (DHT) to search close parents and partners.

PRIME DESCRIPTION

In the preferred embodiment, as a peer buffers the stream that has been played out for a certain period of time, the peer is able to serve another peer if its buffer contains the requested portion of the media. To receive stream from other peers, a new client requesting a streaming media first needs to find out which peers in the system have the requested media. For easy and efficient search of parents and partners, the preferred embodiment proposes a light-weight server in PRIME, called Rendezvous Point (RP). The task of RP is very simple. It maintains a universal system time in the system. It divides its own system time into slots of equal size τ, for instance, five minutes per slot. Each time slot is assigned a time slot ID. The time slot ID space can be wraparound as long as the space is large enough to cover the length of all the medium stored in the MoD server. Let time slot ID space range from 0 to Ψ-1. When a peer requests a media, starting from an offset O, it contacts the RP and requests for its arrival time slot ID. Upon receiving the request, the RP replies the peer with the current time slot s. With s, the peer can then calculate its virtual starting slot s'.

$$s' = \left(s - \frac{O}{\tau}\right) \bmod \Psi.$$

Figure 2:
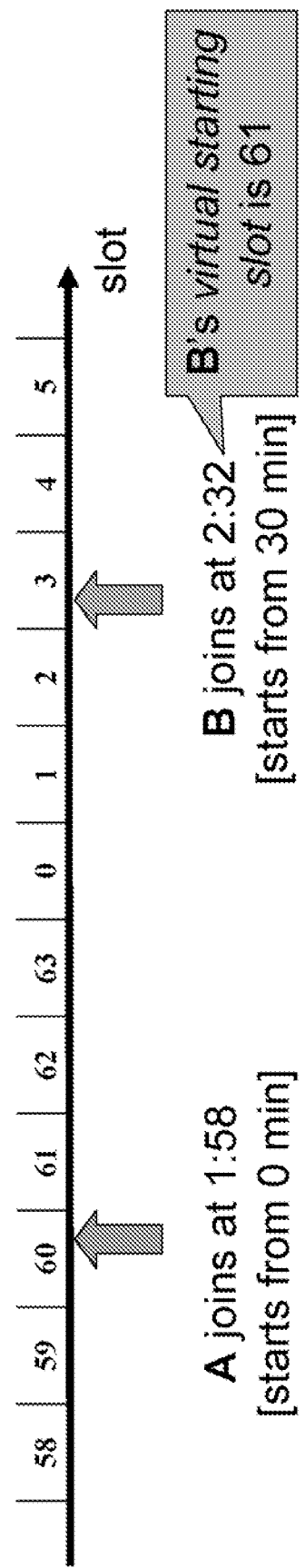
FIG. 2 demonstrates the idea of virtual starting slot and parent searching in PRIME.

The peer then registers its virtual starting slot in a distributed hash table (DHT) in RP. With s', the peer can also search its partners in the DHT with virtual starting slot s' and its parents in the DHT with some earlier virtual starting slots, for example s'-1 and s'-2. FIG. 2 demonstrates the idea of virtual starting slot and parent searching in PRIME. In the figure, peer A joins at time 1:58 (RP's system time) and requests the beginning of the media. A's virtual starting slot ID is 60. Then, peer B joins at time 2:32 (slot 3) and requests the media starting from the 30$^{th}$ minute. Thus, B's virtual starting slot ID is 61. B can then search slot 60 in the DHT, and find A as its parent.

Client Buffer Map

In the preferred embodiment, a PRIME client buffers the media it has played for a certain period of time, depending on the size of its buffer. The client buffer is divided into three parts:

just played—It caches the media the peer has played.
ready to play—It stores the stream received and ready to be played.
collecting—It is a space for collecting the stream from multiple parents.

Figure 3:
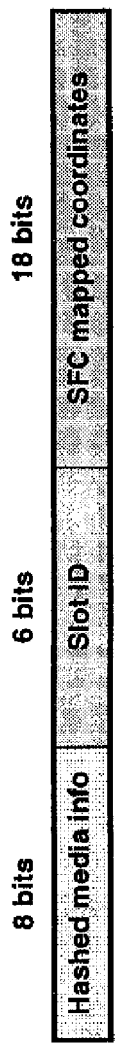
FIG. 3 illustrates the buffer map in PRIME clients.

The three parts can be concatenated and implemented using a circular buffer with a pointer indicating the current playing position. FIG. 3 depicts the buffer map in PRIME clients. The playing pointer is moving toward ready to play and the stream data stored there is fetched to the media renderer for playback. The old data buffered in just played is replaced by the newly collected data and that memory space is reclaimed as collecting again. Since the arrival of stream packets is not in order, they are re-ordered by their sequence numbers in collecting buffer before playback.

Searching Multiple Parents

For a peer y to become a parent of another peer x, its just played buffer must contain the stream data which is being collected by x. The preferred embodiment checks the sequence numbers of the buffered data (for example, the sequence numbers of frames in video streaming) to make sure the condition is met. In searching suitable parents, PRIME takes advantage of DHT, an efficient P2P searching techniques. In the preferred embodiment, all PRIME peers are involved in the DHT for parent searching.

In addition, the disclosed approach teaches that network locations of the parents are also important for efficient data dissemination. If the parent-child relationships are carelessly arranged, there may be triangle routing between peers, leading to waste of network resources and stress increases of some bottleneck links. The situation is worse for high-bandwidth data transmission like media streaming. Therefore, the preferred embodiment of PRIME takes the client network locations into consideration.

Figure 4:
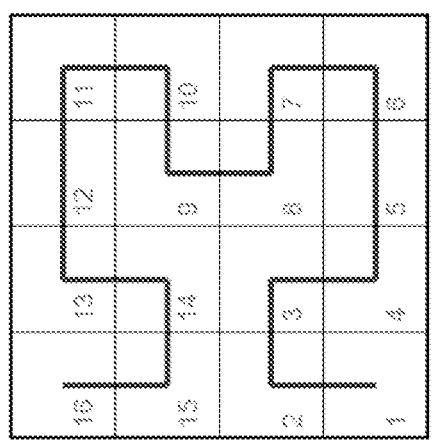
FIG. 4 shows an example of how Hilbert curve maps a two-dimensional space to a one-dimensional space.

The preferred embodiment obtains the network location of a peer via a network coordinate system like GNP and Vivaldi. Such a system gathers several ping measurements between the peer and some landmark machines or some other peers, and returns multi-dimensional coordinates in a Euclidean space. To search close parents, the disclosed approach puts locality into DHT keys registered by the peers. Since most DHTs use a one-dimensional space for keys while coordinates are multi-dimensional, a mapping from the multi-dimensional coordinate space $R^d$ to the one-dimensional DHT key space R is needed. The preferred embodiment deploys space filling curve (SFC), such as Hilbert curve, for the mapping SFC is locality preserving such that if two points in the multi-dimensional space are close their corresponding mapped one-dimensional numbers are also close. Therefore, SFC serves the intended purpose nicely. FIG. 4 shows an example of how Hilbert curve maps a two-dimensional space to a one-dimensional space.

Figure 5:
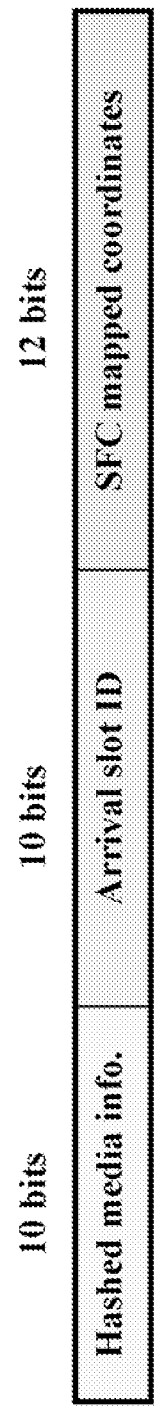
FIG. 5 shows an example of the DHT key structure.

With the mapped coordinates, each peer constructs its 32-bit DHT key consisting of media information and its virtual starting slot ID. As shown in FIG. 5, the DHT key is constructed by combining the fields in the order of importance. The most important field is the media information, followed by the virtual starting slot ID of the peer, and the SFC-mapped coordinates. The disclosed approach hashes the media information for the purpose of balancing DHT load among peers. Each peer registers its own key in the DHT. At the same time, each peer can search its parents using DHT search keys constructed by earlier slot IDs and its own mapped coordinates. Most DHTs can be modified to reply the queries with multiple peers, whose keys are numerically closest to the search key. Since the peer's own mapped coordinates are used in the search key, multiple parents closest to the requesting peer are returned. The peer can then connect to those parents and request for the stream.

Download Scheduling and Partner Collaboration

After connecting to several parents, the peer needs to coordinate its parents for streaming non-overlapping parts of the media. The preferred embodiment divides each media N segments with each segment containing 1-second media, and then divides each segment further into M equal-sized blocks. For example, 1-second video of bitrate 450 kbps is divided into 64 blocks, and thus each block is about 900 bytes which fits into one packet. For each segment of media, a bitmap representation is sent to a parent fort requesting data blocks from that parent. Each block in the segment is represented by one bit, with the bit set to 1 indicating requesting block. With another 2-byte segment number, all data blocks in the media can be identified uniquely.

Since all parents should contain the requested media, one embodiment can assign block requests evenly among parents in round-robin fashion. However, other class of embodiments can consider the bandwidth heterogeneity among parents, i.e., some of them may have less available bandwidth than others. The current embodiment suggests using TCP-Friendly Rate Control (TFRC) for the block transmission, so that rough available bandwidth between the peer and each parent can be obtained by monitoring the speed of each connection. This improved assignment ensures that the number of block requests scheduled to a parent is proportional to the bandwidth between the peer and that parent. That is, $$m_i = \frac{bw_i}{\sum_i bw_i} \times M$$

where $m_i$ is the number of block requests assigned to parent i who has measured bandwidth of $bw_i$. Thus, a parent with more available bandwidth can stream more data to the peer. However, if the aggregate available bandwidth is less than the playout rate R (i.e., $\Sigma_i^{bw_i<R}$), the peer has to connect to more parents.

Figure 6:
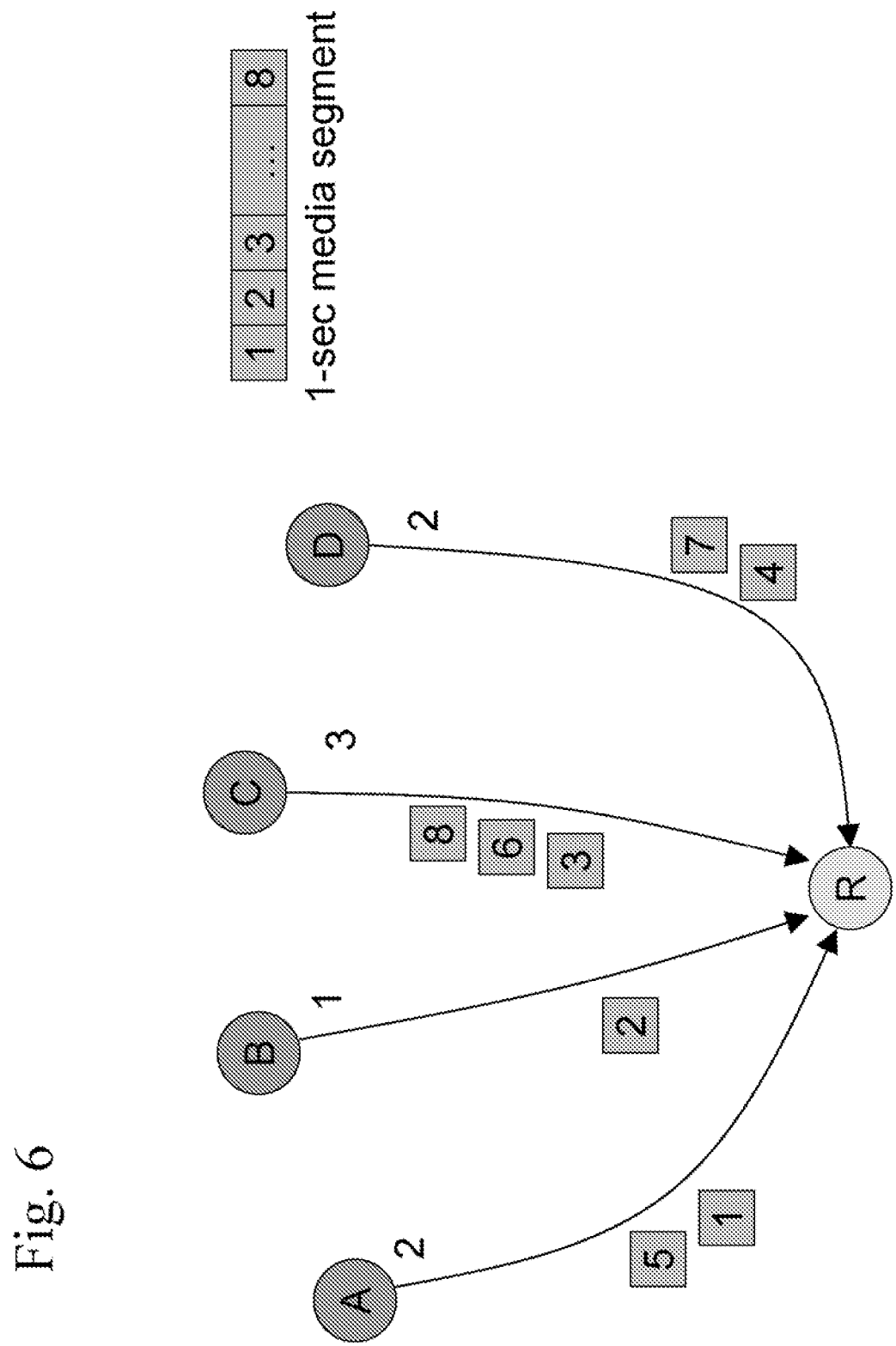
FIG. 6 illustrates an example of download scheduling for a peer R.

FIG. 6 illustrates an example of download scheduling for a peer R. In this example, a 1-second media segment is divided into 8 blocks numbered from 1 to 8. R is connected to four parent node: A, B, C and D, wherein R requests A to send blocks nos. 1 and 5, B no. 2, C nos. 3, 6 and 8, and D nos. 4 and 7.

In the preferred embodiment, each PRIME peer schedules requests every second. In each round of scheduling, if the peer has no parent, it will not ask the server to stream to save server bandwidth. Also, in each scheduling, the peer checks the data blocks in the collecting buffer. Those blocks are previously scheduled and requested a few seconds ago. If there are still some missing blocks, some parents may be crashed or left, or the packets are dropped. Re-scheduling for those missing blocks are required. Unless it is the last chance for requesting the data block, then the requests will not be scheduled to the server. Each client keeps a retry counter for each of its parent. Each time a parent is assigned to a request, its retry counter is incremented by one. And, the counter value is reset to zero whenever a reply with data blocks is received from the parent. If a parent has a retry counter larger than a threshold, the parent is automatically removed from the parent list. This operation mode passively and automatically updates the parent list, and hence, the preferred embodiment does not need control messages for monitoring peer status.

In PRIME, peers with common interest could collaborate to download the media stream. This can increase the number of choices of download source, and hence strengthen the failure resilience. The peers with overlapping collecting buffer can be considered as partners. The only difference between parents and partners is that parents have all the blocks while partners may not have some blocks. Upon updating the collecting buffer, partners need to inform each other to refresh others' status. While scheduling data block requests, partners can also be treated as data sources according to their availability of the data blocks. The partner collaboration in PRIME is similar to the pull-based gossiping protocol. Searching partners is similar to searching parents and, each partner is also attached with a retry counter for detecting partner departure.

User Interactivity Support and DHT Maintenance

Users might jump forward or backward in the media during playback. The current embodiment implements those features by searching the key constructed by the time slot ID where the user is jumping to, and requesting stream from the new parents and partners. When a user jumps to a new position of the media, it updates its own entry in the DHT by going through:

Deregister the old entry in the DHT by routing a request keyed by the original search key with a delete option in the request. Upon receiving the request, the DHT peer removes the requesting peer from the keyed entry.

Register a new entry in the DHT with a new key constructed from the updated virtual starting slot as described above.

These two processes could be done in parallel in the system. Routing in DHT systems normally takes a few hops. Therefore, the jumping operation could be finished within a few seconds.

When a user leaves the system, the user should deregister its entry in the DHT to make sure the entries are updated so as to improve the efficiency of searching peers. However, a peer on a failed node leaves the system without removing its entry. Normal approach for keeping the DHT updated is to keep track of all the peers by either through 1) a central server or 2) the distributed DHT peers. Nevertheless, the first approach is non-scalable and the control messages generated may cause congestion around the server location. The second one also causes too much control overhead at every peer.

The disclosed approach proposes a feedback-based maintenance scheme such that the DHT can still be kept refreshed. When a peer finds that some of the returned results from the DHT are invalid, it can send a feedback to the DHT peer by routing an update message with a delete option specifying which peer is invalid. Upon receiving the message, the DHT peer can update the corresponding entries. As a result, the DHT can always be kept updated.

Simulation Setup

The preferred embodiment of PRIME is simulated with an Internet-like topology produced using GT-ITM topology generator. In the experiments, the following metrics are evaluated.

Server stress—the bandwidth used by the server to stream media to clients. For comparison purpose, the results normalized the server stress by the stream bitrate. For a scalable system, server stress should be as small as possible in order to support more users and handle emergency events like requests from clients who cannot find new parents after parent failure.

Continuity index—the percentage of stream data blocks which are ready during playback. It relates to the quality of the playback. The higher the index, the better the quality of the playback is.

Client stress—the upload bandwidth used by the clients to serve others in the system. The client stress is also normalized by the stream bitrate. In addition, the distribution of client stress is also important to reflect the load balancing among peers.

Control overhead—the bandwidth used for protocol control messages. The lower the control overhead, the more efficient the protocol is.

User access pattern models the user requests. Each request can be modeled by two parameters: (1) starting offset s and (2) accessing time t. Let L be the length of the requested media. In the simulations, the following three different models of user access patterns are considered:

Sequential access model—Under this model, each user requests the entire media, that is, s=0 and t=L.

Random access model—Under this model, both s and t are uniformly distributed with [0,L]. If t>L−s, the user stops at the end of the media (i.e., t=L−s).

Interactive access model—Under this model, users could jump to another position while accessing the media. One parameter, the inter-jumping period w, is added to model the jumping activity. w is exponentially random with mean W. When jumping, the user uniformly selects a random position to access s is uniformly random between 0 and L and t is exponentially random with mean L. When the user reaches the end of the media, it jumps to a random position.

In all models listed above, the user arrival follows a Poisson process with average arrival rate λ.

In the simulation, unless otherwise specified, the results presented are based on the following settings. GT-ITM topology generator is used to create a topology of 4080 nodes (routers) based on transit-stub model in a 1024×1024 grid. The network topology consists of 10 transit domains, each with 8 transit nodes, and a transit node is then connected to 5 stub domains, each with 10 stub nodes. Each stub node in the topology represents a local area network router while each transit node represents an inter-domain router. Each user is then randomly attached to a stub node. The packet loss is modeled by pessimistically setting the packet loss rate of each end-to-end transmission to 5%. The MoD server contains a video for streaming with bitrate of 450 kbps and length of 2 hours. Each peer has collecting buffer of size 5 seconds, ready to play buffer of size 5 seconds and just played buffer of size 10 minutes. Each peer can have at most 5 parents and 5 partners.

At the beginning of each simulation, there is no user in the system. The users then join the system following a Poisson process with mean inter-arrival time of 6 seconds. The average holding time of the users in interactive access model is 2 hours. In the interactive access model, the average inter-jumping time is 20 minutes. In the simulations, the users leave the system ungracefully, meaning that they do not inform their peers about their departure. This has the same effect as node failure. The purpose of doing so is to demonstrate how the system is resilient to node failure. Each simulation lasts for 5 hours.

Simulation Results

This section first illustrates the effect of non-sequential user access pattern, then demonstrates how the size of buffer used in each peer can affect the performance of the system, and finally shows the client stress and control overhead of the simulations.

Experiments show that the preferred embodiment consumes very little server bandwidth (around 8 steams for supporting 1200 users at the same time).

Figure 7A:
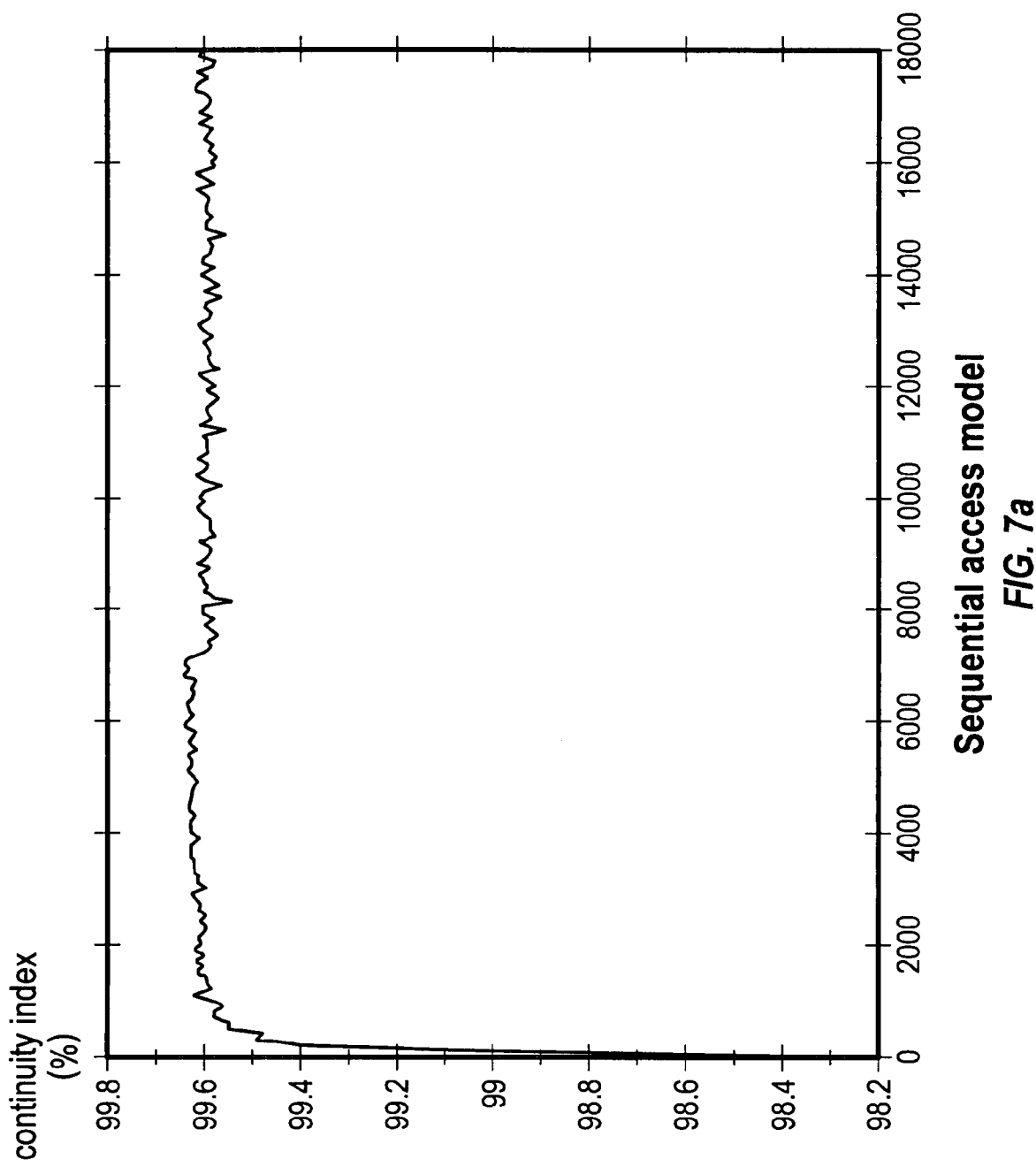
FIG. 7 illustrates the continuity of the received stream under the various user access models.
Figure 7C:
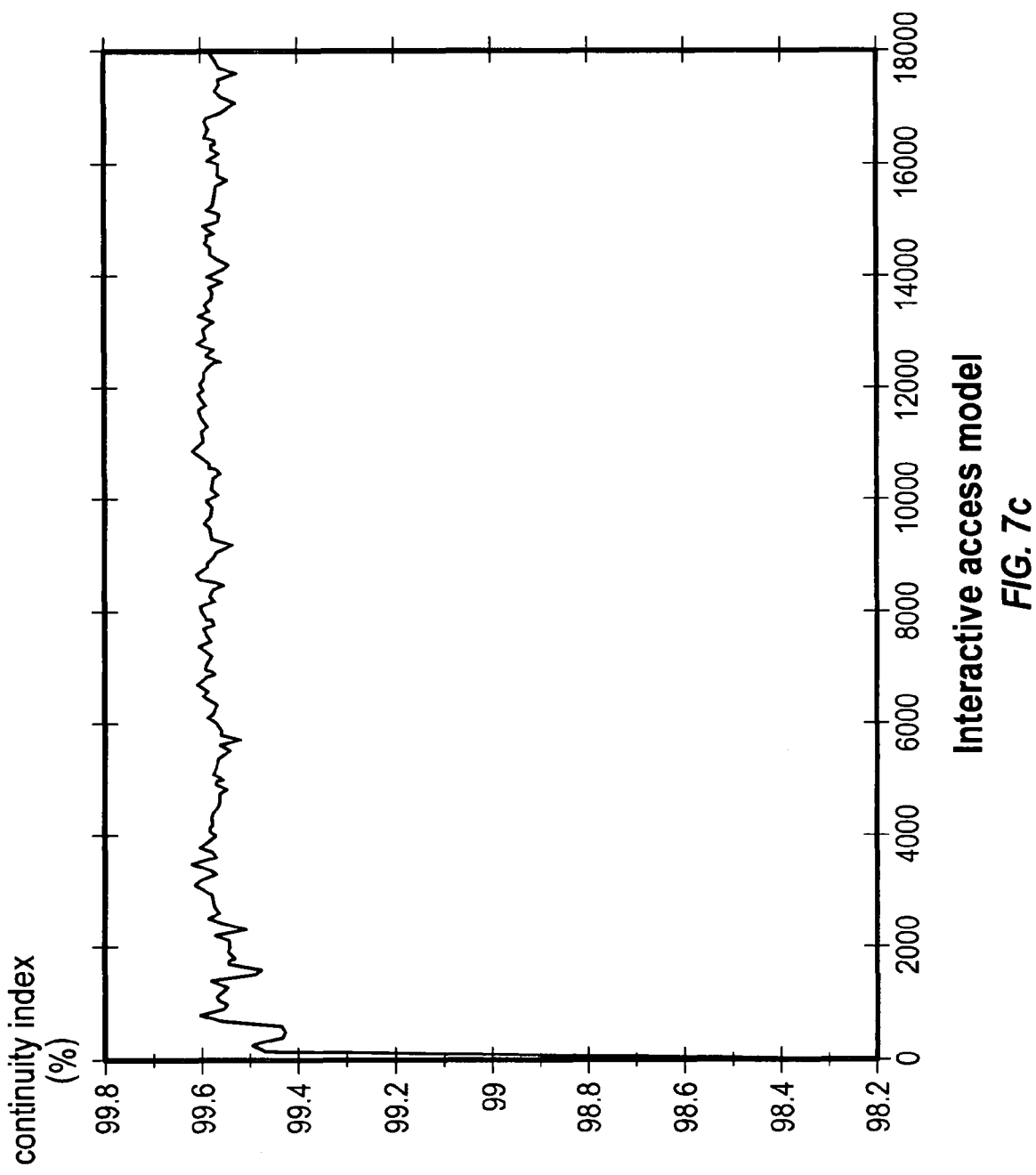

FIG. 7 illustrates how the continuity of the received stream is affected by the user access pattern. Under the random and interactive access models, since the users jump frequently, they may frequently find that their ready to play buffers miss some data blocks, and hence the continuity index decreases. However, under the various access models, PRIME still achieves over 99% continuity. The missing 1% of data blocks can be easily recovered by applying Forward Error Correction (FEC) while encoding the media stream.

Figure 8:
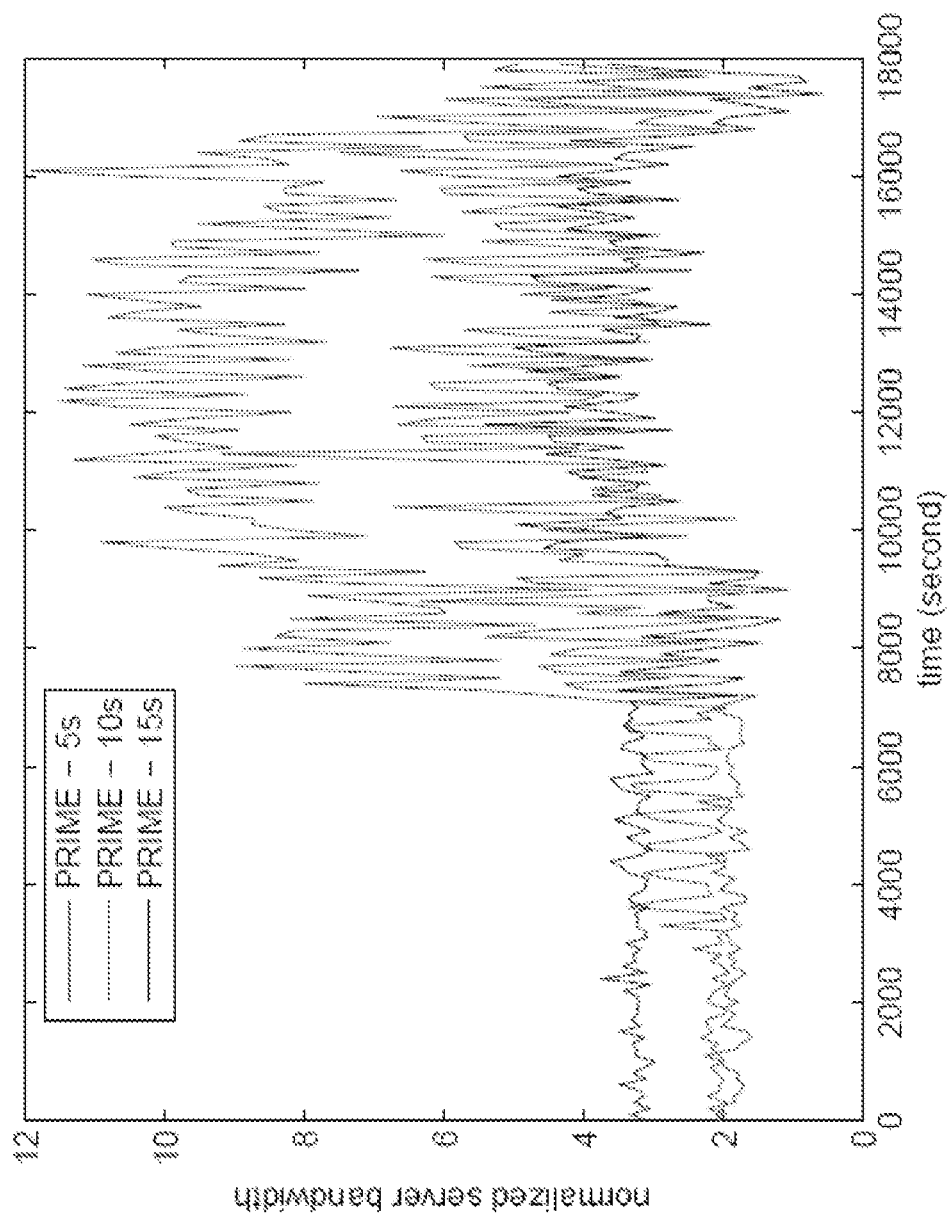
FIG. 8 demonstrates how the size of collecting buffer affects the system performance.

FIG. 8 demonstrates how the size of collecting buffer affects the system performance. Since the results are similar under various models, only results for the sequential access model is presented. As shown in FIG. 8, the larger the collecting buffer, the lower the server stress is. This is because there are more rounds for re-scheduling requests for a data block, the missing blocks due to parent failure or link loss can be recovered by re-transmissions from the remaining parents or partners rather than requesting the missing blocks from the server.

Figure 9:
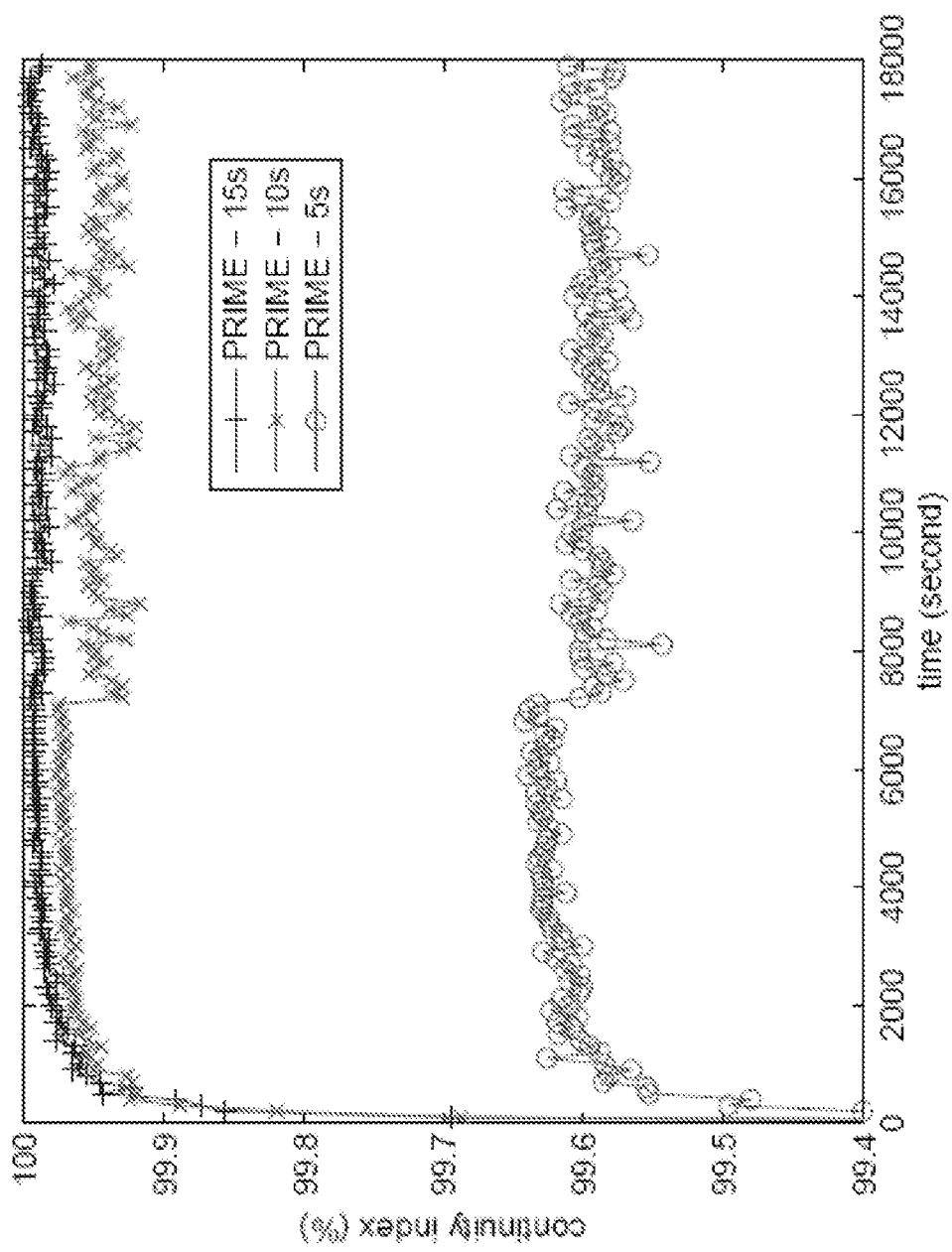
FIG. 9 shows the average continuity index and distribution among the peers with various collecting buffer sizes.

FIG. 9 shows that the increase in the collecting buffer size also improves the continuity of the received stream. This is because larger collecting buffer means there are more chances to collect the stream, hence reducing the probability that a data block misses its playback deadline. The result shows that collecting buffer size accommodating 10 seconds of media is enough to withstand packet loss rate of 5%.

Figure 10A:
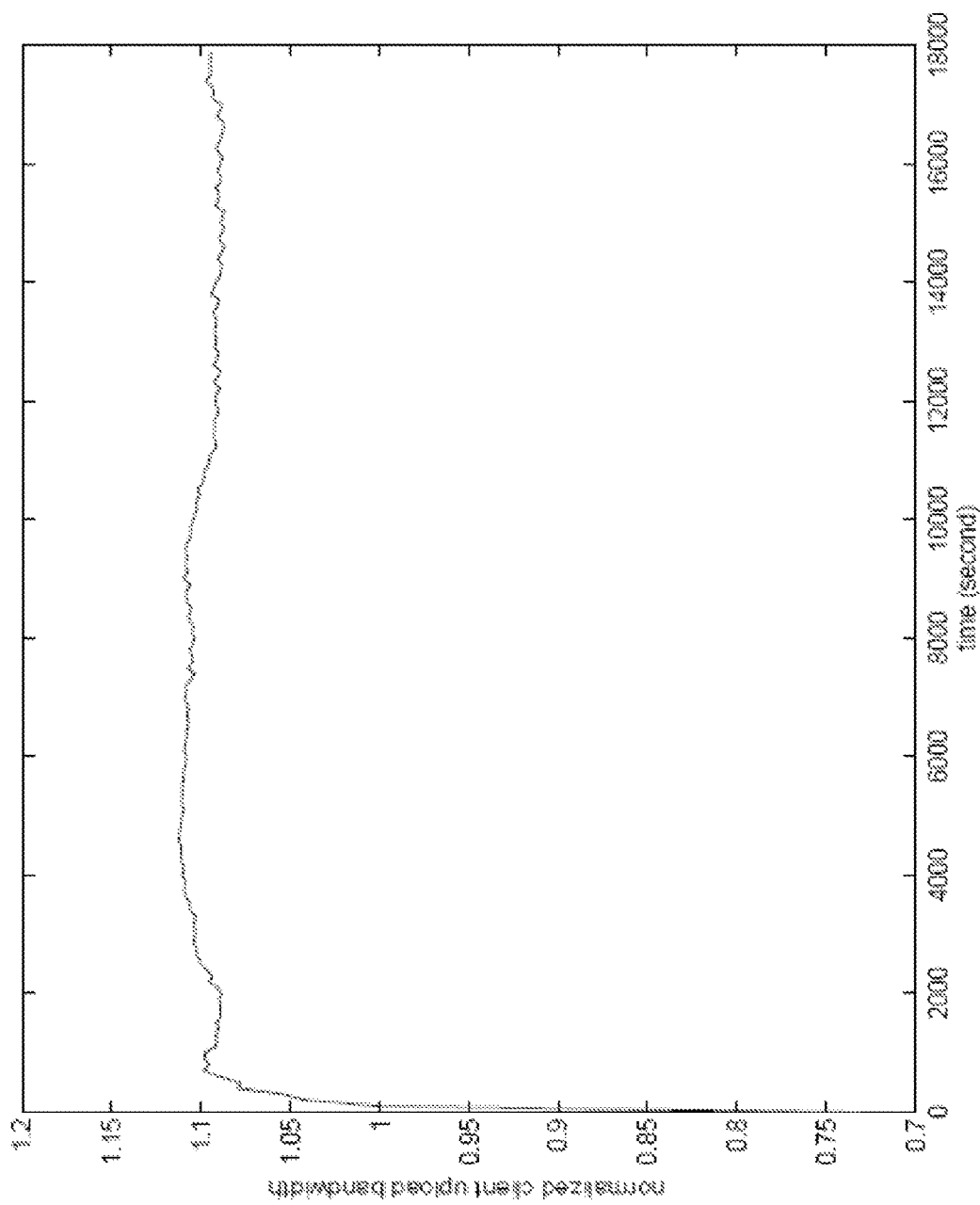
FIG. 10A shows the average client upload stress in the simulation results.
Figure 10B:
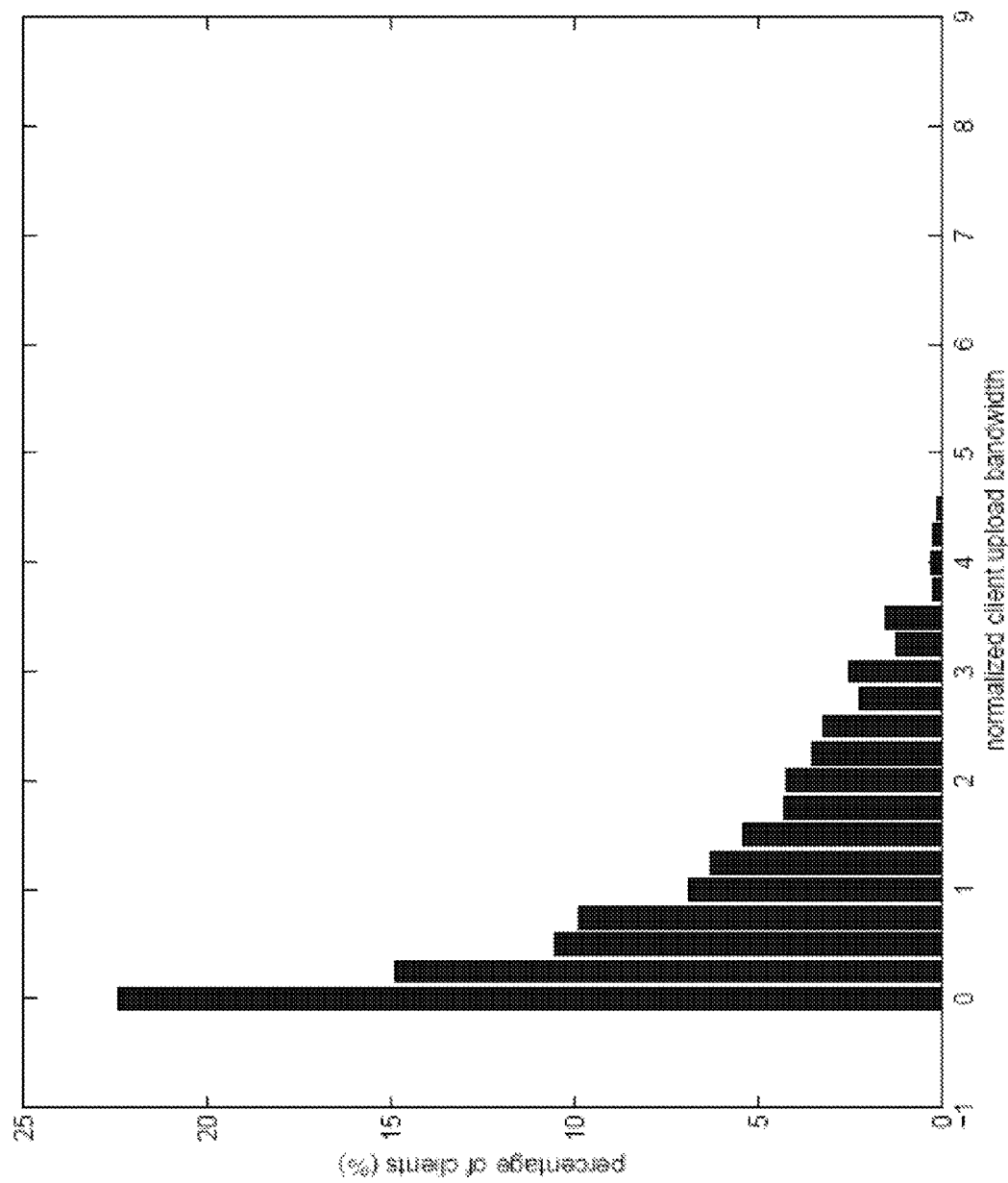
FIG. 10B also reflects that the streaming load is evenly balanced among all the clients in the simulations.

FIG. 10A shows that the average client upload stress is around one stream, meaning that each client is on average supporting another client. The distribution shown in FIG. 10B also reflects that the streaming load is evenly balanced among all the clients. It seems obvious that the load balance in PRIME is much better than that in those tree-based protocols, in which a large portion (over 50%) of clients are leaf nodes and do not serve others.

Figure 11:
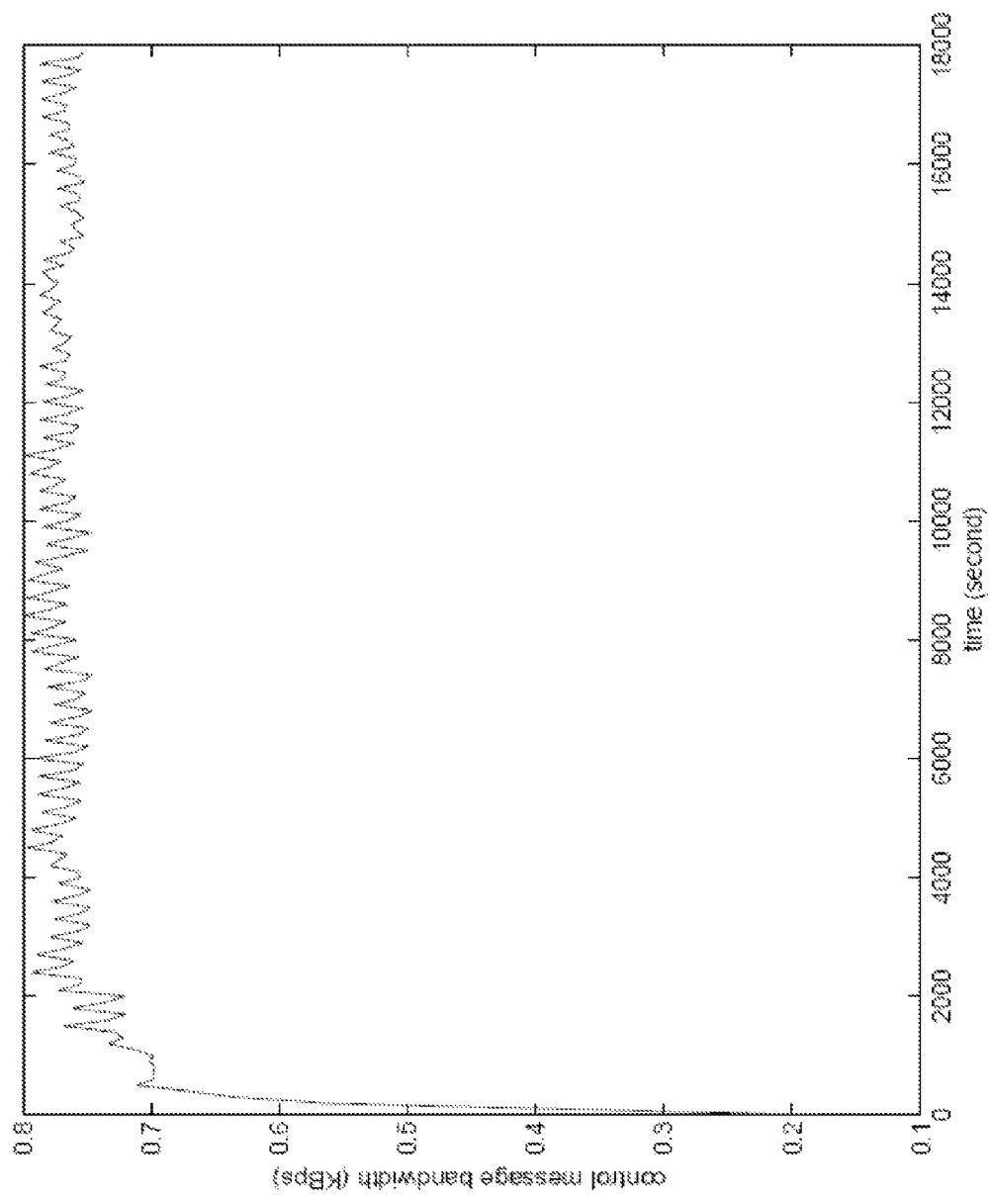
FIG. 11 shows the average control message bandwidth overhead.

Control messages used in PRIME (including join requests, parent requests, buffermap requests, message header of data packets, etc.) are also measured at each peer. FIG. 11 shows that the average control message bandwidth overhead is below 1 KBps, meaning that PRIME uses only a small fraction of bandwidth for control massaging compared to the large media stream and is thus efficient for streaming media.

According to the measurements of the simulations of the preferred embodiment, startup delay is around 7 seconds, where the average end-to-end latency in our topology is around 1 seconds. The startup delay includes the time for searching multiple parents and filling up the buffer before playback.

Since efficient DHTs usually take a few hops to find the targets, around 3 seconds are enough for searching the parents. The time for filling up the buffer depends on the buffer size, but this part can speed up if the bandwidth in this process is not limited. In reality, the average end-to-end latency is around 200 milliseconds, hence the startup delay in the Internet deployment is expected to be around 1.5 seconds which is quite low.

According to various disclosed embodiments (but not necessarily all), there is provided. A method for media-on-demand communications in a peer-to-peer network, comprising the steps of structuring and storing registration information including media information, play start time and locality of registering peer node, determining, upon receiving a request, a list of parent nodes that can optimally provide media downloading service to requesting peer in dependence of media information requested, its media play start time and locality information of requesting peer; and connecting to at least one of said parents to receive, buffer and play said media.

According to various disclosed embodiments (but not necessarily all), there is provided: A network architecture for media-on-demand communications, comprising: a data repository which maintains media information including said media play start time and locality; and a plural of peer nodes capable of receiving, buffering and playing said media; wherein ones of said peers, if not connected to said media server, connects to plural other said peers for downloading optimally determined based on said media information provided by said repository; whereby the aggregated bandwidth at ones of said peers is not smaller than the play rate for said media.

According to various disclosed embodiments (but not necessarily all), there is provided: A network architecture for media-on-demand communications, comprising: a structured-overlay architecture which includes nodes capable of playing, sharing and buffering media; wherein a media server divides a media into segments and said nodes cooperate adaptively in downloading said media; a data repository which maintains information of ones of said nodes on said buffered media, time when said media play commenced and locality; a lookup procedure with which a node requests said repository for at least one optimal parent node from said nodes to connect to for media streaming; a media downloading logic with which ones of said nodes but not media server request said connected parent nodes for media streaming and said parent nodes perform said media streaming; and automatic procedures which update said repository to provide improved data when triggered by some user or network events.

According to various disclosed embodiments (but not necessarily all), there is provided: A network architecture for media-on-demand communications, comprising: a media server which is the original source of media on demand and divides said media into segments, a data repository which maintains information, at ones of a plurality of peer-to-peer-connected nodes, on said buffered media segments, including time when said media play commenced and locality; and a least one peer node capable of playing, sharing and buffering media; wherein said peer (a) requests, from said data repository, a list of parent nodes that can optimally provide media downloading service in dependence of their media play start time, locality information, bandwidth, playout rate and delay information, connects to at least one parent node and sends connected nodes download request adaptively; (b) registers with said data repository information including media play commencing time and locality; (c) receives and buffers portion of said media segments received from at least one of said parent nodes; and (d) distributes, upon receiving a download request from a child node, portion of media requested to said child node.

According to various disclosed embodiments (but not necessarily all), there is provided: A method for a peer to participate in media-on-demand communications in a peer-to-Peer network, comprising the steps of registering, with a Rendezvous Point (RP) in said network, media information including play commencement time of said media and locality of the peer doing the registration wherein the play time is represented by slot numbers and locality is in dependence of coordinate information; requesting, from said RP, a list of parent nodes that can optimally provide media downloading service in dependence of their media play startime, locality information, available bandwidth, playout rate, distance and delay information; connecting to at least one said parent node; sending said connected parent nodes requests periodically for certain portion of said media for download; buffering portion of said media from said parent nodes and distributing, upon receiving download request, portions of media requested to requesting node; and optionally, updating said RP status information when said peer decides to leave said network or detects certain events with said parent nodes.

According to various disclosed embodiments (but not necessarily all), there is provided: A method for media-on-demand communications in a peer-to-peer network, comprising the steps of (1) dividing media into segments of fixed length playtime and ones of segments further into blocks; (2) maintaining media information of ones of peers in said network indexed and keyed on said buffered media segments, said media play commencement time and locality information wherein the playtime is represented by virtual slot numbers and locality information is in dependence of coordinates of said peer; (3) determining, from said media information, a list of parent nodes that can optimally provide media downloading service in dependence of their media play commencement time, locality information, available bandwidth, playout rate and transmission delay, for a peer node; (4) connecting said node to at least one parent node whereby the aggregated bandwidth from connected parent nodes is at least not smaller than said playout rate; (5) requesting, from said new peer nodes for segments and blocks of said media from said connected parent nodes, in dependence available bandwidth of ones of connections; (6) buffering, at ones of peer nodes, said media segments and blocks received from said parent nodes and distributing, upon receiving download scheduling, media blocks requested to requesting node; and (7) updating said RP status information when said peer decides to leave said network or detects certain events with said parent nodes, including node failure.

According to various disclosed embodiments (but not necessarily all), there is provided: A scalable Media-on-Demand (MoD) method to a large group of users in the Internet. This method makes use of peer buffering capabilities to collaborate in the distribution and downloading of media, facilitated by a central repository for the search of optimal peers as parent nodes to connect to and for the support of advanced features such as fast forward and backward plays. The method relieves the server load by shifting the media streaming functionality to the client side with high media receiving continuity and quality, leading to well-balanced and low network loads.

Modifications and Variations

As will be recognized by those skilled in the art, the innovative concepts described in the present application can be modified and varied over a tremendous range of applications, and accordingly the scope of patented subject matter is not limited by any of the specific exemplary teachings given.

Some examples of modifications and variations are briefly mentioned above, but many others are possible.

For example, instead of requesting media blocks from all parents, a peer can request media blocks from one or more parents but leaving connections to other parents open as backups.

For another example, the preferred embodiment divides media into segments containing 1-second duration of play content. Other class of embodiments can divide media based on different time durations.

Yet another class of embodiments might use a DHT search key with a different structure or different length to accommodate various network sizes.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph size of 35 USC section 112 unless the exact words "means for" are followed by a participle.

The claims as filed are intended to be as comprehensive as possible, and NO subject matter is intentionally relinquished, dedicated, or abandoned.

What is claimed is:

1. A method for media-on-demand communications in a peer-to-peer network, comprising:
   structuring, by a system including a processor, and storing in a distributed hash table (DHT), registration information including media information related to media, media play start time, and locality of a registering peer node, wherein the media play start time comprises a virtual starting slot number determined by the registering peer node;
   grouping a first set of nodes according to a first media play start time;
   grouping a second set of nodes according to a second media play start time, wherein the second media play start time is different from the first media play start time, and wherein at least one of the first media play start time or the second media play start time comprise an updated virtual starting slot number based on node interactivity with the media;
   determining, by the system, in response to a request for the media, a list of parent nodes from among the first set and the second set of nodes comprising a capability to provide media downloading service to a requesting peer node based on the media information related to the media, based on a requested media play start time for the media that corresponds to the first media play start time and the second media play start time, and based on locality of the requesting peer node, wherein the list of parent nodes comprise parent nodes capable of streaming non-overlapping portions of the media to the requesting peer node;
   determining, by the system, at least one parent node of the list of parent nodes in each of the first set and the second set of nodes, based on the locality of the requesting peer node, and concurrently connecting the requesting peer node to the at least one parent node in each of the first set and the second set of nodes for receiving, buffering, and playing the non-overlapping portions of the media; and
   storing the updated virtual starting slot number based on the node interactivity with the media in the DHT.

2. The method of claim 1, further comprising:
   dividing, by the system, the media into segments comprising a fixed play time media content.

3. The method of claim 1, wherein the structuring registration information includes numbering the media play start time as a numbered virtual time slotted into a fixed size.

4. The method of claim 1, wherein the structuring registration information includes numbering the media play start time as one of a set of virtual starting slot numbers in a set of fixed size slots, and resetting the one of the set of virtual starting slot numbers to a minimum number when a maximum number is reached.

5. The method of claim 4, wherein the numbering the media play start time includes numbering the media play start time based at least in part on a size of the fixed size slots.

6. The method of claim 4, wherein the numbering the media play start time includes numbering the media play start time based at least in part on the maximum number.

7. A network architecture for media-on-demand communications, comprising:
   a data repository, including a processor, configured to maintain media information related to media in a distributed hash table (DHT), the media information including a media play start time comprising a virtual starting slot number determined by a registering peer node and locality information of the registering peer node; and
   a plurality of peer nodes configured to receive, buffer, and play the media, wherein at least one of the plurality of the peer nodes, if not connected to a media server, is further configured to concurrently connect to a plurality of other peer nodes of the plurality of peer nodes for downloading the media,
   wherein a first set of nodes of the plurality of peer nodes are grouped according to a first media play start time and a second set of nodes are grouped according to a second media play start time, wherein the second media play start time is different from the first media play start time, and wherein at least one of the first media play start time or the second media play start time comprise an updated virtual starting slot number based on node interactivity with the media,
   wherein the plurality of other peer nodes are connected to the at least one of the plurality of the peer nodes, by the repository, based at least in part on the media information maintained by the data repository, and based at least in part on a requested media play start time for the media that corresponds to a first media play start time and a second media play start time associated with the other peer nodes, wherein the plurality of other peer nodes comprise other peer nodes capable of streaming non-overlapping portions of the media to the at least one of the plurality of the peer nodes, wherein a list of parent nodes comprising one or more nodes from both the first set of nodes and the second nodes is created based on locality of a requesting peer node and based on a determination that the requested media play start time corresponds to the first media play start time and the second media play start time, and wherein the requesting peer node is concurrently connected to at least one parent node in each of the first set and second set of nodes for receiving, buffering, and playing the non-overlapping portions of the media, and wherein aggregated bandwidth of the plurality of other peer nodes is determined, by the data repository, to be not smaller than a play rate for the media.

8. The network architecture of claim 7, wherein the media is configured to be transmitted by at least one of the plurality of other peer nodes in blocks, a plurality of which blocks comprise a segment comprising a fixed play time media content.

9. The network architecture of claim 7, wherein the data repository is further configured to employ the DHT to maintain the media information relating to the media including the media play start time comprising the updated virtual starting slot number.

10. The network architecture of claim 7, wherein the media play start time is configured, by the data repository, as one of a set of virtual starting slot numbers in a set of fixed size slots, and wherein the one of the set of virtual slot numbers is configured to be reset, by the data repository, to a minimum number when a maximum number is reached.

11. The network architecture of claim 7, wherein the locality information is based at least in part on coordinate information of a network coordinate system associated with the plurality of peer nodes.

12. A network architecture for media-on-demand communications, comprising:
- a structured-overlay architecture that includes nodes configured to play, share, and buffer media, wherein a media server is configured to divide the media into segments, and wherein the nodes are further configured to cooperate adaptively in downloading the media;
- a data repository device configured to maintain information associated with the nodes, information related to the media based at least in part on whether the media is buffered at the nodes, a time when play of the media commenced, and locality associated with the nodes in a distributed hash table;
- a lookup procedure of the data repository device configured to allow a node of the nodes to request at least a portion of the data repository device for a list of at least two parent nodes of the node to concurrently connect the node to the at least two parent nodes for media streaming based at least in part on a requested media play start time for the media that corresponds to a first media play start time and a second media play start time associated with the at least two parent nodes and based on locality of the requesting node, wherein at least one of the at least two parent nodes belongs to an identified set of nodes associated with the first media play start time and at least one other of the at least two parent nodes belongs to an identified set of nodes associated with the second media play start time, wherein the second media play start time is different from the first media play start time and at least one of the first media play start time or the second media play start time comprises an updated virtual starting slot number based on node interactivity with the media, wherein the at least two parent nodes are capable of streaming non-overlapping portions of the media to the node;
- a media downloading logic, wherein the nodes, but not the media server, are further configured to request to stream at least a portion of the media from connected parent nodes of the nodes, and wherein the connected parent nodes are configured to stream the at least the portion of the media based at least in part on the request to stream the at least the portion of the media, wherein the at least the portion of the media from connected parent nodes comprises non-overlapping portions of the media from at least two of the connected parent nodes; and
- at least one automatic procedure of the data repository device configured to update the distributed hash table based at least in part on a user interactivity event associated with the media.

13. The network architecture of claim 12, wherein at least one of the segments comprises fixed play time media content.

14. The media server of claim 12, wherein at least one of the segments is configured, by the media server, as a plurality of blocks.

15. The network architecture of claim 12, wherein the data repository device is further configured as a database system embedded with the media server.

16. The network architecture of claim 12, wherein said data repository device is further configured as an entity separated from the nodes.

17. The network architecture of claim 12, wherein at least one of the first, second, or requested media play start time is configured, by the data repository device, as one of a set of virtual starting slot numbers in a set of fixed size slots, and wherein the one of the set of virtual starting slot numbers is configured to be reset, by the data repository device, to a minimum number when a maximum number is reached.

* * * * *